（12）United States Patent
Yagi

(10) Patent No.: US 6,541,775 B2
(45) Date of Patent: Apr. 1, 2003

(54) PORTABLE INFORMATION DEVICE

(75) Inventor: Shigeru Yagi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 60 days.

(21) Appl. No.: 09/843,812

(22) Filed: Apr. 30, 2001

(65) Prior Publication Data

US 2001/0048081 A1 Dec. 6, 2001

(30) Foreign Application Priority Data

May 10, 2000 (JP) ........................................ 2000-137373

(51) Int. Cl.⁷ .............................. G01J 1/42; G04B 47/06
(52) U.S. Cl. ......................................... 250/372; 368/10
(58) Field of Search ............................ 250/372; 368/10, 368/11, 13, 14, 242

(56) References Cited

U.S. PATENT DOCUMENTS

| 4,239,554 A | * | 12/1980 | Yamazaki | 136/255 |
| 4,733,383 A | * | 3/1988 | Waterbury | 368/10 |
| 4,985,632 A | * | 1/1991 | Bianco et al. | 250/372 |
| 5,008,548 A | * | 4/1991 | Gat | 250/372 |
| 5,387,798 A | * | 2/1995 | Funakoshi et al. | 250/474.1 |
| 5,481,506 A | * | 1/1996 | Kita | 368/10 |
| 5,500,532 A | * | 3/1996 | Kozicki | 250/336.1 |
| 5,686,727 A | * | 11/1997 | Reensta et al. | 250/227.11 |
| 5,847,397 A | * | 12/1998 | Moustakas | 250/370.06 |
| 5,894,454 A | * | 4/1999 | Kondo | 368/10 |

FOREIGN PATENT DOCUMENTS

| GB | 2181833 A | * | 4/1987 | ............. G01J/1/42 |
| JP | A 6-18325 | | 1/1994 | |
| JP | 11259004 A | * | 9/1999 | ............. G09F/9/00 |

* cited by examiner

Primary Examiner—Constantine Hannaher
Assistant Examiner—Albert Gagliardi
(74) Attorney, Agent, or Firm—Oliff & Berridge, PLC

(57) ABSTRACT

A portable information device such as a portable telephone, portable electronic mail device or portable navigator capable of measuring UV-rays with no deterioration of the display function is provided. In the device, a UV-ray sensor is disposed in an information display region. The UV-sensor has light sensitivity only to UV-rays and preferably has a light receiving surface made of a compound semiconductor.

8 Claims, 5 Drawing Sheets

PORTABLE INFORMATION DEVICE

BACKGROUND OF THE INVENTION

1. Field of the Invention

This invention concerns a portable information device having a UV-sensor capable of easily detecting UV-rays present in living environments.

2. Description of the Related Art

In recent years, an increase of UV-rays on the ground by the depletion of ozone layers is mentioned as one of the most significant problems for global environments. Such UV-rays give significant effects on health such as onset of skin cancers, an increase of photo-hypersensitivity and light aging due to damages of DNA, as well as remarkable effects on skin such as stains and freckles resulting in cosmetic problems. Therefore, a necessity for the measurement of UV-rays in the living environments has increased, for example, in the field of beauty care or medical treatment.

A UV-ray measuring instrument for exclusive use has been required for UV-ray dosimetry and it is troublesome to carry about such UV measuring instrument for exclusive use and it has been impossible to measure UV-rays in a simple manner.

Further, in existent UV-sensors, it has been necessary to use sensors having sensitivity from UV light to visible light with attachment of a visible light cut filter and with light shield. Therefore, the sensors have thickness and complicated structure and become high cost, and cannot be used simply. Further, since the color of the sensor is black and the size of the UV-ray measuring instrument is increased because the UV-sensor has to be disposed independently for light shield, it also results in a problem in view of the design.

Japanese Published Unexamined Patent Application Hei 6-18325 discloses a wrist watch with a photodetector in which a UV-sensor and a solar all are disposed together to the outside near the time display surface of the watch (liquid crystal).

This invention intends to provide a portable information device usually capable of measuring UV-dose simply with no particular provision of a UV-ray measuring apparatus for exclusive use.

This invention also intends to provide a portable information device capable of measuring UV-dose and also excellent in view of design.

SUMMARY OF THE INVENTION

The present invention has been made in view of the above circumstances and provides a portable information device as described below:

A portable information device in which a UV-sensor is disposed in an information display region of the portable information device having predetermined functions.

A portable information device, wherein the information display region has an information display unit and a visible light transparent protection cover covering the information display unit, and a light receiving surface of the UV-sensor is disposed in parallel with the information display unit below the protection cover.

According to this invention, a light receiving surface of a UV-sensor is attached in an information display region of the portable information device which is used most frequently and can always be carried about in daily life, and the amount of measured UV-rays can be displayed on the information display surface by utilizing a photoelectric current or a photo-induced voltage generated from the UV-sensor. Accordingly, the information display surface of the portable information device can be utilized effectively with no particular requirement for a UV-ray measuring instrument.

DESCRIPTION OF THE ACCOMPANYING DRAWINGS

Preferred embodiments of the invention will be described in detail based on the followings, wherein.

PREFERRED EMBODIMENTS OF THE INVENTION

Figure 1:
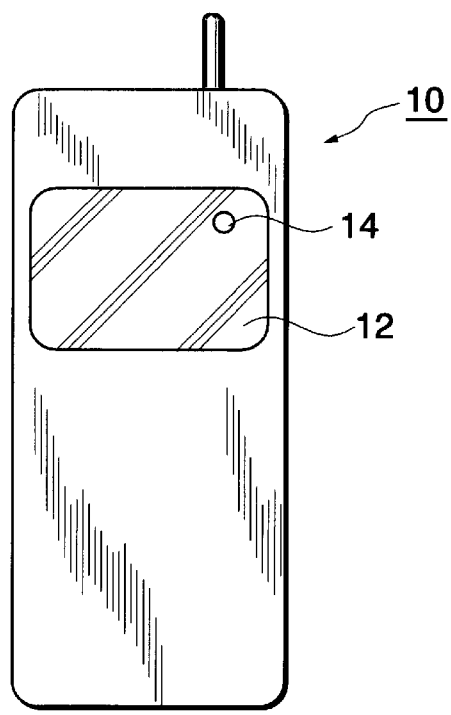
FIG. 1 is a schematic constitutional view illustrating an embodiment of a portable telephone as a portable information device according to this invention.

Preferred embodiments of this invention are to be explained.

In this invention, the portable information device means a device having a display surface for electronically displaying input/output information by communication and it includes, for example, portable telephones, portable electronic mail devices, portable navigators, small-sized computers and devices also serving as pocket calculators. Since such a portable information device has various functions in a small volume, there is no room for additionally locating a large sensor. In this invention, since an extremely small light receiving surface of a sensor can be used, the receiving surface of the sensor can be attached within an information display region.

In the information display region of the portable information device described above, glass, organic glass or the like is usually used as a protection window. UV-rays contained in the sunlight reaching the ground have a wavelength of 200 nm or longer due to absorption of oxygen. Further, stratospheric ozone absorbs UV-rays from 360 nm to 300 nm. Among them, UV-rays at 320 nm or less are called UV-B while those at 400 to 320 nm are called UV-A. Usual glass such as soda-glass scarcely transmits UV-rays at 300 nm or less, but almost transmits UV-rays at 300 nm or longer. Further, most of engineering plastics used frequently as transparent organic glass highly transmit UV-rays at 300 to 400 nm.

Accordingly, by attaching a UV-sensor in the information display region of the portable information device, UV-rays can be measured and the result of the measurement can be displayed on the information display surface, as well as this can be used for input/output of information to remote places.

In this text, "in the information display region" means the inside of a region for displaying information. In the information display surface of the portable information device, the surface is constituted with a protection window made of glass or an organic glass surface, and a polarization film or a liquid crystal layer is present in the lower surface. In this invention, the light receiving surface of the UV-sensor is attached at an arbitrary place such as a rear face of the protection window, the polarization film surface or the surface of the liquid crystal layer or electrode where UV-rays reach and where there is no trouble for the information display.

The light receiving surface of the UV-sensor may be of any constitution depending on the hue of the light receiving surface of the UV-sensor. For instance, if the light receiving surface of the UV-sensor is transparent, since it gives no trouble to information display, the light receiving surface of the UV-sensor can be attached over the entire surface or in arbitrary region of the information display surface. Further, the form or the hue of the light receiving surface of the UV-sensor can be determined arbitrarily considering the design at the information display surface of the portable information device. For example, when the light receiving surface of the UV-sensor is provided with a hue of noble metal gold, a high quality image can be provided in view of design. Alternatively, when the hue of the light receiving surface of the UV-sensor is made identical or similar with the information display color, this can provide a feeling of using the existent information display surface with no awareness of the region in which the light receiving surface of the UV-sensor is attached in view of the design.

Figure 2:
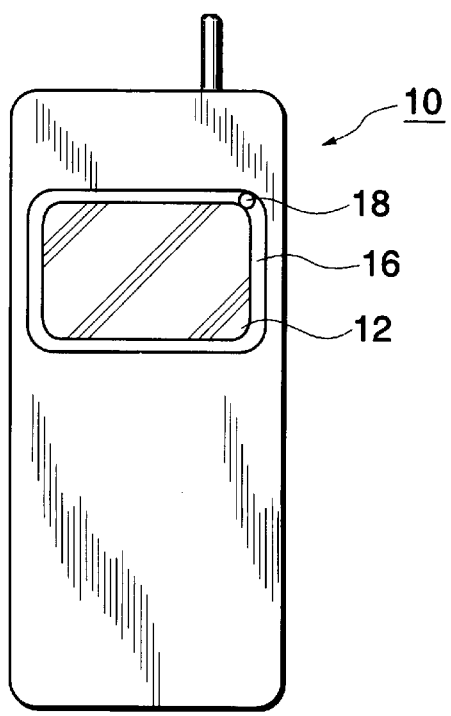
FIG. 2 is a schematic constitutional view illustrating another embodiment of a portable telephone as a portable information device according to this invention.

FIG. 1 is an explanatory view illustrating an example of disposing a light receiving surface of a UV-sensor in a portable telephone as a portable information display device according this invention. In FIG. 1, a light receiving surface of a UV-sensor 14 is attached to a corner in an information display surface 12 of a portable telephone 10. FIG. 2 is an explanatory view illustrating another example of disposing a light receiving surface of a UV-sensor in a portable telephone as a portable information display device according this invention. In FIG. 2, a light receiving surface of a UV-sensor 18 is attached between a window frame 16 surrounding an information display surface 12 of a portable telephone 10 and a protection window to the information display surface 12 including the window frame 16.

Figure 3:
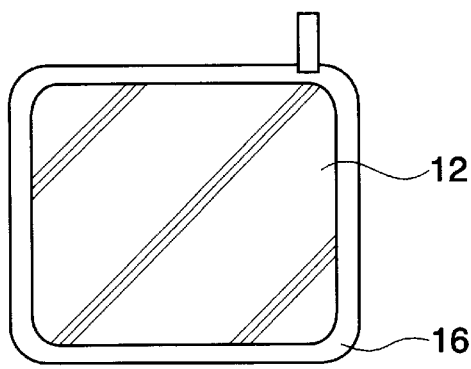
FIG. 3 is a schematic constitutional view illustrating a further embodiment of a portable telephone as a portable information device according to this invention.

FIG. 3 is an explanatory view illustrating a further example of disposing a light receiving surface of a UV-sensor in a portable telephone in a case where a region of the information display surface 12 is entirely or partially covered with a receiving surface of the sensor. In this case, generated photovoltaic power can be supplied as an electric power.

In the foregoing, explanations have been made particularly of an example of the portable telephone but the UV-sensor may be located to similar portions of the device also in a case of portable electronic mail devices or portable navigators.

Figure 4:
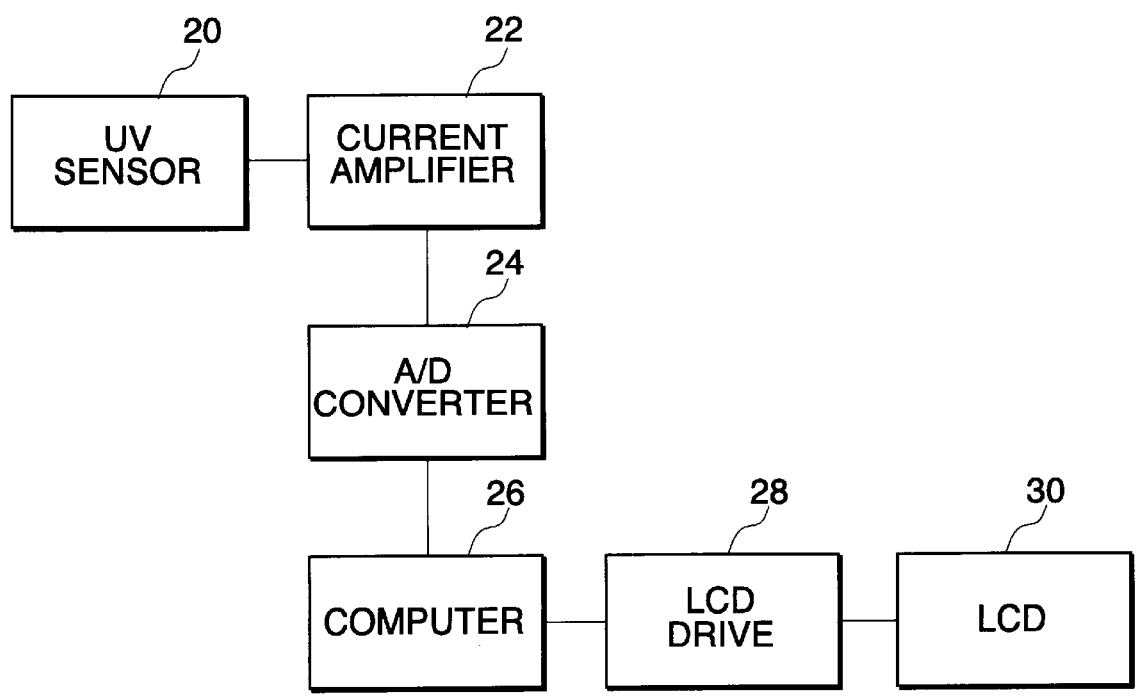
FIG. 4 is a constitutional view for a UV-ray measuring system in the portable information device according to this invention.

FIG. 4 is a constitutional diagram illustrating an embodiment of a UV-ray detection system in this invention. FIG. 4 shows a UV-sensor 20, a current amplifier 22, an A/D converter 24, a computer 26, an LCD drive 28 and an LCD (information display surface) 30.

In the UV-sensor (light receiving surface) 20 in this invention, the output can be taken out as a photo-induced current flowing between electrodes, or can be taken out as a photoelectric current by applying a voltage. A photo-induced current type is preferred since this does not consume electric power for the portable device. Further, photo-induced voltage may also be measured.

The photo-induced current is amplified by way of the current amplifier 22, then converted through the A/D converter 24 into digital signals and reaches the computer 26. In the computer 26, a threshold value for the UV-ray dose, for example, deleterious to human bodies is previously set and can display or output an alarm buzzer when the measured UV-dose exceeds the threshold value that this is a deleterious UV-dose, by way of the LCD drive 28 to the LCD (information display surface) 30. For the LCD (information display surface) 30, an existent mechanism of the portable telephone can be utilized as it is by making it possible to display on the information display surface 12 itself.

The display may be made as energy unit (UV-ray dose) or UV index. Conversion of the output may be analog conversion by applying an output current to an appropriate resistance or may be digital conversion with a determined coefficient.

The thickness of the UV-sensor depends on the thickness of a portion to which the sensor is attached such as a protection window (window material), a polarization film or a liquid crystal layer, and it is from 0.05 to 2 mm and, preferably, 0.1 to 0.5 mm.

As the UV-ray sensor, those formed from photodiodes such as GaP or Si having sensitivity in a visible region by cutting off a visible area by a filter, or an oxide semiconductor such as titanium oxide or zinc oxide can be used. Particularly preferred is use of a UV-sensor including a nitride compound semiconductor having rapid light response, capable of controlling the absorption region by the composition and excellent in view of the design such as reduced size requiring no additional space for the display portion, reduced thickness or color.

As the semiconductor usable for the UV-sensor in this invention, a compound semiconductor including at least one of elements of Al, Ga and In and nitrogen formed on a substrate is desirably used. The semiconductor may be of single crystal or non-single crystal. Further, those having a light sensitivity mainly in a wavelength region shorter than 400 nm can be used but the skirt of the sensitivity on the side of the long wavelength may extend to a longer wavelength beyond 400 nm. The UV-sensor using the nitride compound semiconductor as the UV-sensor in this invention has no sensitivity to visible light so that it can be used advantageously in a bright environment as it is. The semiconductor photo-receiving device may be used alone or plural of them may be arranged.

Non-single crystal photo-semiconductor including amorphous or crystallite as the nitride compound semiconductor may include an amorphous phase or crystallite phase or may be in a mixed state of the crystalline phase and the amorphous phase. Further, it may be a single crystal film. The crystal system may be one of a cubic system, hexagonal system or in a mixed state of plural crystal systems. The size of the crystallite is from 5 nm to 5 $\mu$m and can be measured by X-diffractiometry or electron beam diffractiometry and by measurement for the cross sectional shape by using an electron microscopic photograph. Further, it may be of a columnar grown crystal, may be a film showing a single peak by X-ray diffraction spectroscopy and highly oriented at a crystal face, or may be of a single crystal.

The semiconductor, in a case of non-single crystal, may be a semiconductor containing hydrogen at a hydrogen concentration of 0.5 at % or more and 50 at % or less. Further, it may contain onefold coordination halogen element. When hydrogen contained in the semiconductor is less than 0.5 at %, it is insufficient to inactivate defect levels formed in the band by passivating bonding defects at the crystal grain boundary or bonding defects or non-bonding sites at the inside of the amorphous phase by bonding with hydrogen, so that bonding defects or structural defects increase to lower the dark resistance and reduce light sensitivity, and the semiconductor cannot function as a practical photoconductor any more.

On the contrary, when hydrogen in the film exceeds 50 at %, a probability that two or more hydrogen atoms are bonded with group III elements and group V elements increases, so that the elements do not keep a three dimensional structure but form a two dimensional or chained network and, particularly, form a great amount of voids at the crystal grain boundary and, as a result, form a new level in the band to deteriorate electric characteristics and degrade mechanical properties such as hardness. Further, the film tends to be oxidized to result in a great amount of impurities in the film and no satisfactory photoelectric characteristics can be obtained.

Further, when hydrogen in the film exceeds 50 at %, since hydrogen inactivates a dopant to be doped for controlling the electric characteristics, non-single crystal photosemiconductor including electrically active amorphous or crystallite cannot be obtained.

The amount of hydrogen can be measured for the absolute value by hydrogen forward scattering (HFS). It can also be estimated by the measurement of a hydrogen emission amount by heating or by the measurement of IR spectrum. Further, the hydrogen bonding state can be measured easily by infrared absorption spectrum.

When the ratio of the numbers of atoms between the group III element and nitrogen is 0.5:1.0 or less, or 1.0:0.5 or more, a zinc blend type portion is decreased in the group III-group V bonding to increase defects and it cannot function as a satisfactory semiconductor any more.

The optical gap of the film can be changed optionally depending on the mixing ratio of the group III element. It can be changed to such a band gap as capable of absorbing light from 300 nm to 330 nm by addition of Al in a case of increasing the band gap to greater than 3.2–3.5 eV based on GaN:H, by which UV-rays mainly for UV-B can be measured. Further the band gap can be controlled also by adding Al and In together.

The composition for each of the elements in the film can be measured by a method of using, for example, an X-ray photoelectron spectroscopy (XPS), electron micro probe, Rutherford back scattering (RBS) or secondary ion mass spectrometer.

A semiconductor layer including at least one elements of Al, Ga and In and nitrogen for the UV-ray measuring device according to this invention can be manufactured as described below.

Figure 5:
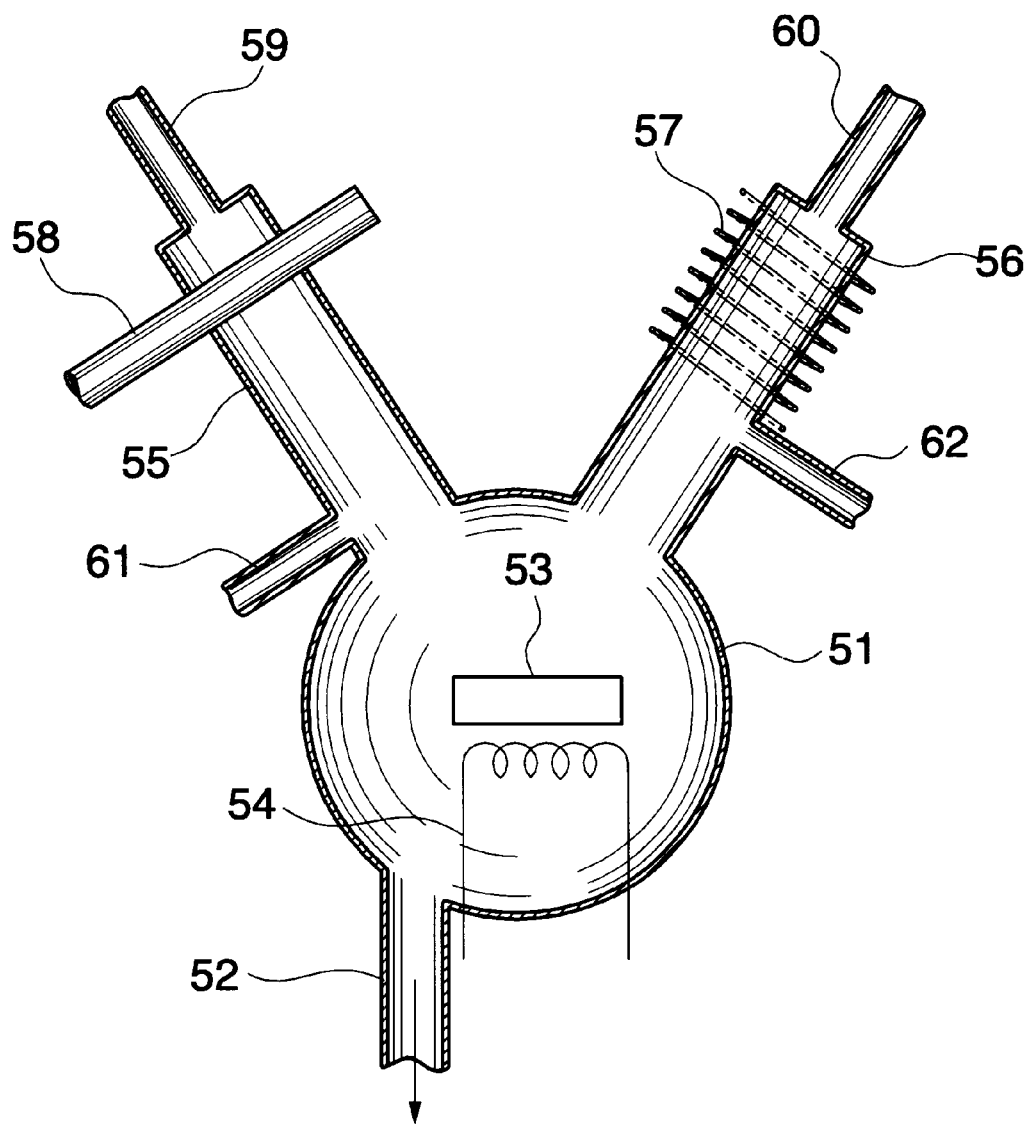
FIG. 5 is a constitutional view illustrating a method of manufacturing a semiconductor constituting a UV-sensor in this invention.

An explanation is to be made with reference to the drawing. The method shown in FIG. 5 is a method of using plasmas as an activating unit. In the drawing are shown a vessel 51 that can be exhausted to vacuum, an exhaust port 52, a substrate holder 53, a heater 54 for heating the substrate and a quartz tube 56 connected with the vessel 51, which is in communication with gas introduction tubes 59 and 60. A quartz tube 55 is connected with a gas introduction tube 61 and the quartz tube 56 is connected with a gas introduction tube 62.

In this apparatus, $N_2$ is used, for example, as a nitrogen element source and introduced from the gas introduction tube 59 into the quartz tube 55. A microwave at 2.45 GHz is applied to a microwave guide tube 58 connected with a microwave oscillator (not illustrated) using a magnetron to generate electric discharge in the quartz tube 55. $H_2$ is introduced, for example, from another gas introduction port 60 into the quartz tube 56. A high frequency at 13.56 MHz is applied from a high frequency oscillator (not illustrated) to high frequency coils 57 to generate electric discharge in the quartz tube 56. Then, trimethyl gallium is introduced from the downstream of the discharge space by way of the gas introduction tube 62, by which amorphous or crystallite non-single crystal gallium nitride photosemiconductor can be formed on a substrate.

Whether the film formed includes amorphous or crystalline, or highly oriented columnar grown polycrystal or single crystal depends on the kind of the substrate, substrate temperature, flow rate and pressure of the gas, and discharging conditions. The substrate temperature is from 100° C. to 600° C. At a higher substrate temperature and/or with low flow rate of the group III starting gas, crystallite or single crystal tends to be formed. When the substrate temperature is lower than 300° C., the film tends to be crystalline when the flow rate of the group III material gas is low and also tends to be crystalline when the substrate temperature is higher than 300° C. even in a case where the flow rate of the group III starting gas is higher than that at the low temperature condition. Further, crystallization can be proceeded further in a case of conducting, for example, $H_2$ discharge than in the case of not conducting $H_2$ discharge. An organic metal compound containing indium or aluminum can also be used instead of trimethyl gallium or they may be used in admixture.

Further, the organic metal compounds described above may be introduced separately from the gas introduction tube 61.

Further, amorphous or crystalline nitride semiconductors of an optional conduction type such as n-type or p-type can be obtained by introducing a gas containing at least one element selected from C, Si, Ge and Sn and a gas containing at least one element selected from Be, Mg, Ca, Zn and Sr from the downstream of the discharging space (through gas introduction tube 61 or gas introduction tube 62). In case of using C, carbon of the organic metal compound may be used depending on the condition.

In the apparatus described above, active nitrogen or active hydrogen formed by discharge energy may be controlled independently or a gas containing nitrogen and hydrogen atoms together such as $NH_3$ may be used. $H_2$ may be added further. Further, it is possible to adopt a condition that active hydrogen is liberated and formed from the organic metal compound. Since activated III group atoms and nitrogen atoms are present in a controlled state on the substrate and the hydrogen atoms convert methyl groups or ethyl groups into inactive molecule such as methane or ethane under the conditions described above, carbon is not introduced despite a low temperature and an amorphous or crystallized state with reduced film defects can be formed. Further, a plasma CVD apparatus may also be used.

In the apparatus described above, high frequency oscillator, microwave oscillator, electron cyclotron resonance system or helicon plasma system may be used as the activating unit. They may be used each alone or two or more of them may be used together. They may be microwave oscillators or high frequency oscillators. In the case of the high frequency discharge, an induction type or a capacitance type may be used. Further, electron cyclotron resonance system may be used for them. When different activation units (excitation units) are used, it is necessary that discharge can be taken place simultaneously under identical pressure, and pressure difference may be disposed in the discharging space and in the film forming portion (in the vessel 5). In a case of conducting the process under the identical pressure, when different activation units (excitation units), for example, microwave and high frequency wave discharge are used, the excitation energy for the excitation species can be changed considerably, which is effective for the control of the film quality.

The film of the semiconductor layer that can be used for the portable information device according to this invention can be formed in an atmosphere in which at least hydrogen is activated by using, for example, reactive vapor deposition, ion plating or reactive sputtering.

The substrate used in this invention may be electroconductive or insulative and may be crystalline or amorphous. The material for the conductive substrate can include, metals such as aluminum, stainless steel, nickel and chromium, alloy crystals thereof and semiconductors such as Si, GaAs, GaP, GaN SiC and ZnO.

Further, an insulative substrate formed by applying electrifying treatment to the surface of the substrate may also be used. The insulative substrate includes, for example, those made of polymeric film, glass, quartz and ceramics. The electrifying treatment is conducted by forming a film of the metals described above or gold, silver or copper by vapor deposition, sputtering or ion plating.

Further, light may be entered either on the side of the substrate or on the side of the semiconductor. Upon incidence of light from the side of the transparent conductive substrate, the transparent support usable in this case can include inorganic transparent materials such as glass, quartz, sapphire, MgO, LiF and $CaF_2$, as well as transparent organic resin films or plates such as fluoro resin, polyester, polycarbonate, polyethylene, polyethylene terephthalate and epoxy.

For the transparent electrodes disposed on the transparent support, those formed by using transparent conductive materials such as ITO, zinc oxide, tin oxide, lead oxide, indium oxide and copper iodide and by the method of vapor deposition, ion plating or sputtering, or those formed by using metals such as Al, Na and Au into semi-transparent thickness by vapor deposition or sputtering are used. For measuring a short wavelength of 330 nm or less, a vapor-deposited semi-transparent metal electrode is preferred and light may be entered through the electrode.

Further, the transparent electrode may be disposed directly on the semiconductor layer, or a pair of electrodes disposed at a predetermined gap therebetween may be used. A transparent electrode may be prepared by using transparent conductive materials such as ITO, zinc oxide, tin oxide, lead oxide, indium oxide and copper iodide as the electrode material and by the method, for example, of vapor deposition, ion plating or sputtering, or by using metals such as Al, Ni and Au formed into a semi-transparent thickness. Alternatively, the metal described above formed into an increased thickness may be used for an untransparent electrode.

As the material for the semiconductor, organic metal compounds containing one or more elements selected from Al, Ga and In can be used.

For the organic metal compounds, liquid or solid materials such as trimethyl aluminum, triethyl aluminum, tertiary butyl aluminum, trimethyl gallium, triethyl gallium, tertiary butyl gallium, trimethyl indium, triethyl indium and tertiary butyl indium may be used by being evaporated alone, or in a mixed state by being bubbled with a carrier gas. As the carrier gas, hydrogen, $H_2$, hydrocarbon such as methane or ethane, halogenated hydrocarbon such as $CF_4$ or $C_2F_6$ can be used.

As the starting nitrogen material, gas and liquid materials such as $N_2$, $NH_3$, $NF_3$, $N_2H_4$ and methyl hydrazine can be used by being vaporized or bubbled by a carrier gas.

Further, in the semiconductor, an element may be doped into the film for p, n control. As the n-type element, Li as Ia group, Cu, Ag or Au as Ib group, Mg as IIa group, Zn as IIb group, Si, Ge, Sn or Pb as IVa, and S, Se or Te as VIa group can be used.

For the p-type element, Li, Na, K as Ia group, Cu, Ag, Au for Ib group, Be, Mg, Ca, Sr, Ba or Ra as IIa group, Zn, Cd or Hg as IIb group, C, Si, Ge, Sn or Pb as IVa group, S, Se or Te as VIa group, Cr, Mo or W as VIb group and Fe, Co or Ni as VIIIa group can be used.

In the semiconductor film, an undoped film is of a weak n-type and an electric field can be formed in the inside by forming a Schotky barrier or pn junction for obtaining light sensitivity. Further, it may be formed into an i-type for extending a depletion layer in the inside. In view of the above, Be, Mg, Ca, Zn and Sr are particularly preferred.

As the doping method, it is possible to use $SiH_4$, $Si_2H_6$, $GeH_4$, $GeF_4$ and $SnH_4$ for n-type, $BeH_2$, $BeCl_2$, $BeCl_4$, cyclopentadienyl magnesium, dimethyl calcium, dimethyl strontium, dimethyl zinc and diethyl zinc can be used in the gaseous state for i-type and p-type. Further, the element can be doped into the film by using a known method such as heat diffusion method or ion implantation method.

The UV-sensor according to this invention may be a single layer type, or a lamination type in which semiconductor layers of different band gaps are formed such that UV-rays of different wavelength bands can be separately measured.

With the constitution as described above, portable information devices having a UV-ray measuring function also excellent in view of design can be constituted without increasing the size or the weight and without deteriorating the function in portable telephones, portable mail devices or portable navigators used outdoor which are usually carried about, with no particular provision of special UV-ray measuring devices.

EXAMPLES

This invention is to be explained with reference to examples.

Example 1

Figure 6:
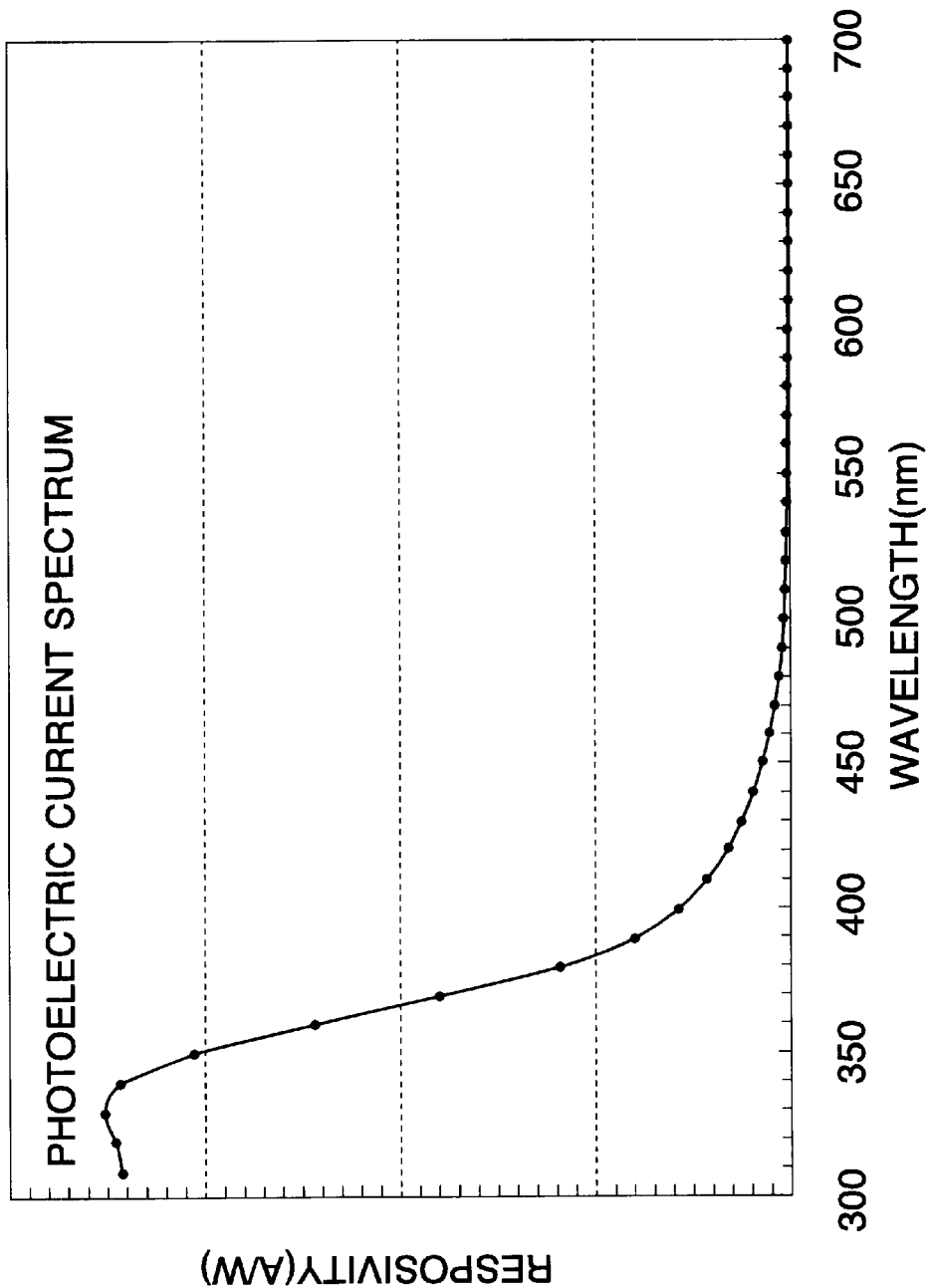
FIG. 6 is a graph for spectral sensitivity characteristics of a sensor obtained in Example 1.
Figure 7:
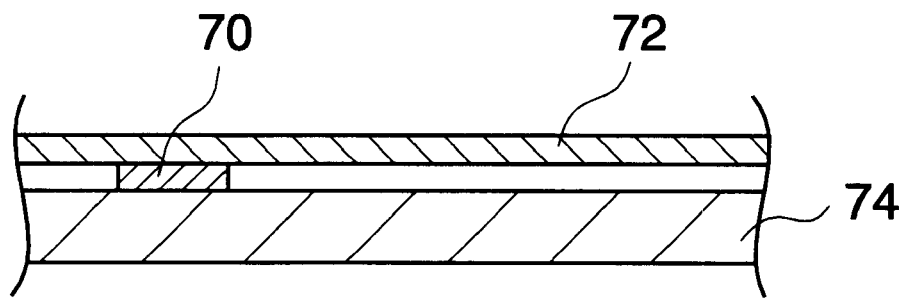
FIG. 7 is a schematic constitutional cross sectional view for a main portion illustrating an embodiment for an image display surface of a portable telephone.

Indium tin oxide (ITO) was sputtered at 100 nm to a borosilicate glass substrate of 0.2 mm in thickness to form a transparent electrode, on which Mg doped hydrogenated GaN film was prepared to 100 nm in thickness by using a remote-plasma metal organic chemical vapor deposition method. The film was transparent. On this film, an Au electrode of 2 mm diameter was formed by vacuum vapor deposition. Silver wires were connected as terminals by means of conductive adhesives to each of the electrodes. The device was of gold color, having a thickness as thin as 0.2 mm, with the side of a sensor being 4×4 mm. FIG. 6 shows the spectral responsivity of the sensor. FIG. 6 shows that the sensor has sensitivity to light from the vicinity of 400 nm and the sensitivity is maximized near 350 nm. The sensor generated photo-induced current and could measure the UV-rays at zero bias voltage.

A UV-sensor 70 was adhered at the back of the display surface (protection window) 72 of a portable telephone by applying transparent adhesive to a portion of the liquid crystal 74 where letters are not present while keeping off the Au electrode surface. The sensor was gold in color, situated between letters or symbols on the display surface and resulted in no particular problem in view of the design. When the photo-induced current by the UV-rays from the UV-sensor is connected through the AD converter to the display driver, a portable telephone having a UV-ray measuring function can be provided.

Example 2

Figure 8:
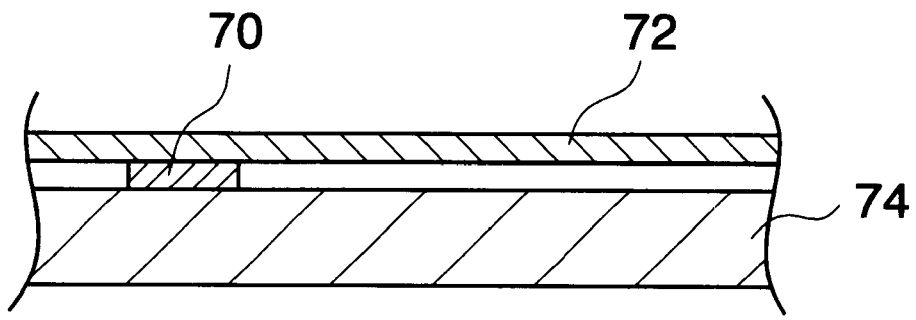
FIG. 8 is a schematic constitutional cross sectional view for a main portion illustrating another embodiment for an image display surface of a portable telephone.

The UV-sensor 70 of Example 1 was adhered using a transparent adhesive tape on the surface of a liquid crystal 74 so as to be situated between icons as shown in FIG. 8. In this case, since the surface of the liquid crystal device can be utilized as an attaching portion for the UV-sensor, there is no particular problem in view of the design. When the photo-induced current by the UV-rays from the UV-sensor is connected through the AD converter to the display driver, a portable telephone having a UV-ray measuring function can be provided.

Example 3

A semi-transparent Au electrode was prepared on an Mg doped hydrogenated GaN transparent film of 100 nm in thickness of Example 1 to prepare a UV-rays sensor. The UV-ray sensor was adhered using transparent adhesives on letters on the surface of liquid crystal. Since the sensor is a pale blue color and can see the underlying letters through the adhesives, there is no particular problem in view of the design. When the photo-induced current by the UV-rays from the UV-sensor is connected through the AD converter to the display driver, a portable telephone having a UV-ray measuring function can be provided.

This invention can provide a portable information device having a UV-ray measuring function always capable of measuring the amount of UV-rays measured so far by a UV-ray measuring device for exclusive use, simply and conveniently, and with high accuracy, not deteriorating the performance inherent to the portable device in view of function and design and at a reduced cost.

What is claimed is:

1. A portable information device having predetermined functions, comprising:

a UV-sensor being disposed in an information display of the portable information device.

2. A portable information device according to claim 1, wherein the UV-sensor is a sensor having light sensitivity substantially only to UV-rays.

3. A portable information device according to claim 1, wherein the information display comprises an information display unit and a visible light transparent protection cover covering the information display unit, and a light receiving surface of the UV-sensor is disposed in parallel with the information display unit below the protection cover.

4. A portable information device according to claim 1, wherein the light receiving surface of the UV-sensor has a noble metal color.

5. A portable information device according to claim 4, wherein the light receiving surface of the UV-sensor is a compound semiconductor and the compound semiconductor is colorless transparent.

6. A portable information device according to claim 1, wherein the light receiving surface of the UV-sensor is a compound semiconductor and the sensor has a noble metal color.

7. A portable information device according to claim 1, wherein the light receiving surface has a color identical with or similar to that of the information display.

8. A portable information device according to claim 1, wherein the compound semiconductor is a non-single crystal III-V group compound semiconductor having hydrogen.

* * * * *